H. T. COLDWELL.
LAWN MOWER.
APPLICATION FILED OCT. 6, 1919.

1,354,169.

Patented Sept. 28, 1920.
2 SHEETS—SHEET 1.

Inventor
Harry T. Coldwell
By Rudolph [illegible]
Attorney

H. T. COLDWELL.
LAWN MOWER.
APPLICATION FILED OCT. 6, 1919.
1,354,169.
Patented Sept. 28, 1920.
2 SHEETS—SHEET 2.
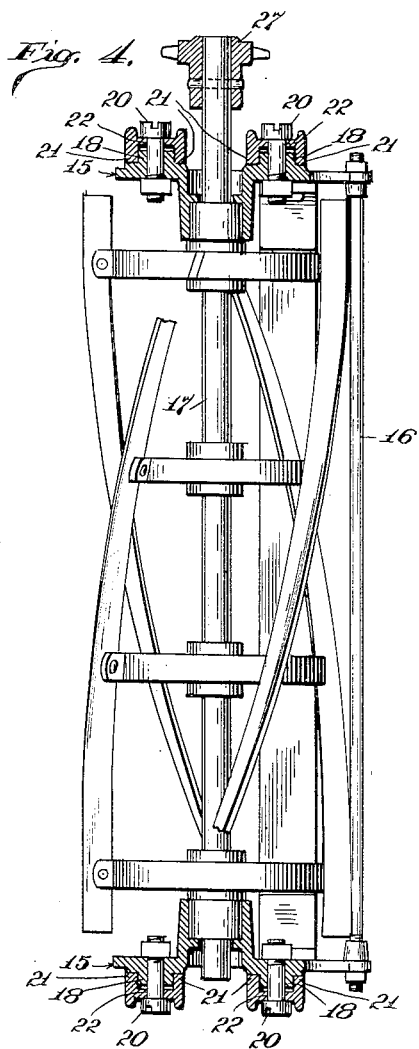
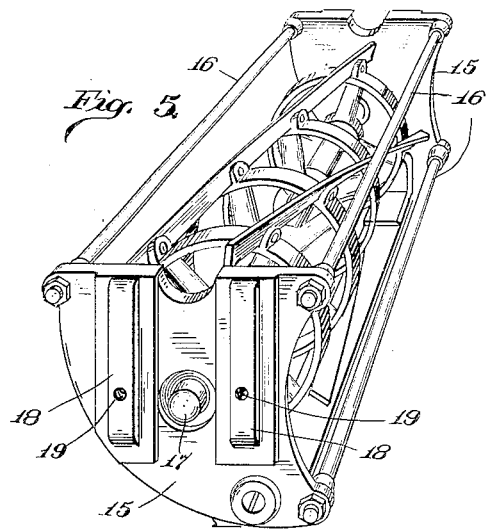
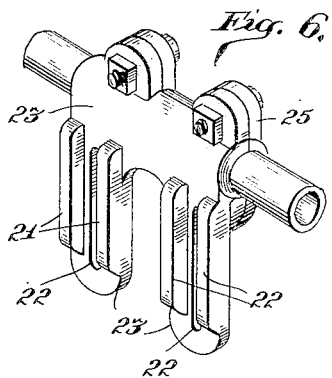
Inventor
Harry T. Coldwell
By
Attorney.

UNITED STATES PATENT OFFICE.

HARRY T. COLDWELL, OF CHICAGO, ILLINOIS, ASSIGNOR OF ONE-HALF TO GEORGE A. SANFORD, OF MORRISTOWN, NEW JERSEY.

LAWN-MOWER.

1,354,169.  Specification of Letters Patent.  Patented Sept. 28, 1920.

Application filed October 6, 1919. Serial No. 328,899.

*To all whom it may concern:*

Be it known that I, HARRY T. COLDWELL, citizen of the United States, residing at Chicago, in the county of Cook and State of Illinois, have invented certain new and useful Improvements in Lawn-Mowers; and I do hereby declare the following to be a full, clear, and exact description of the invention, such as will enable others skilled in the art to which it appertains to make and use the same.

This invention relates to improvements in lawnmowers and has for its object to provide a lawnmower of that type wherein the so-called wipers or cutting blades and the shaft and disks carrying the same are movable bodily from the machine for the purpose of sharpening and repair, the present invention relating more particularly to means whereby the elevation of the mowing elements may be raised and lowered to a far greater extent than is possible with lawnmowers at present in use to the end that such lawnmowers may be successfully used for cutting very tall grass without necessitating the primary use of scythes or sickles.

A further object of the invention is to provide a lawnmower of the type referred to which is very light while at the same time it is simple and durable in construction and wherein the frame may be readily made of pieces of wrought iron pipe in place of castings whereby the liability to breakage is greatly decreased.

The invention consists in the features of construction and combinations of parts hereinafter fully described and particularly claimed.

A suitable embodiment of the invention is illustrated in the accompanying drawings in which:

Fig. 4 is a plan section on the line 4—4 of Fig. 1.

Fig. 5 is a perspective view of the mower unit removed from the mower frame.

Fig. 6 is a detail perspective view of guides employed for adjustably supporting the mower unit.

Figure 1:
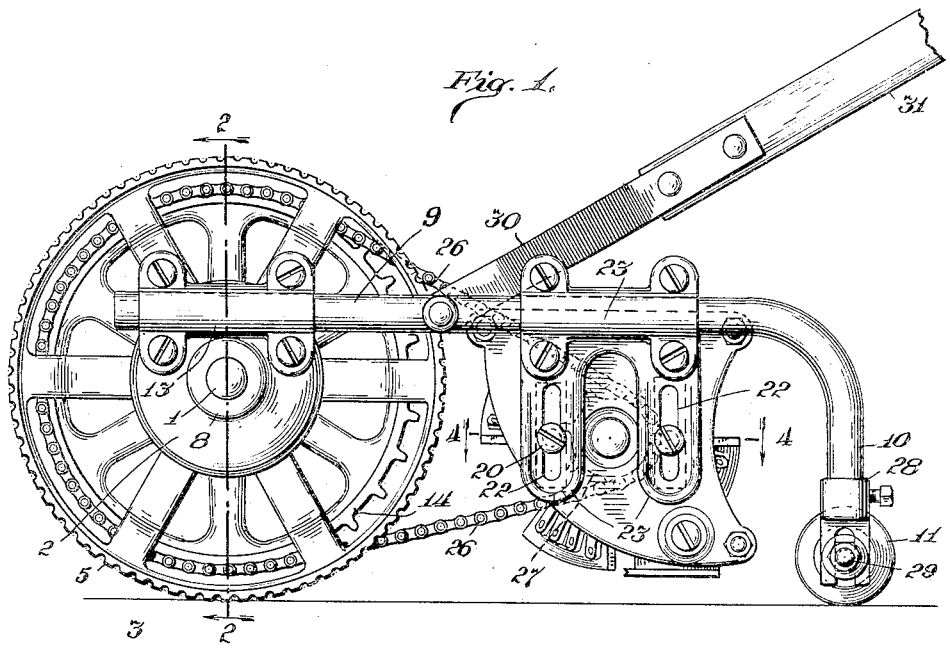
Figure 1 is a view in side elevation of a lawnmower constructed in accordance with my invention.
Figure 2:
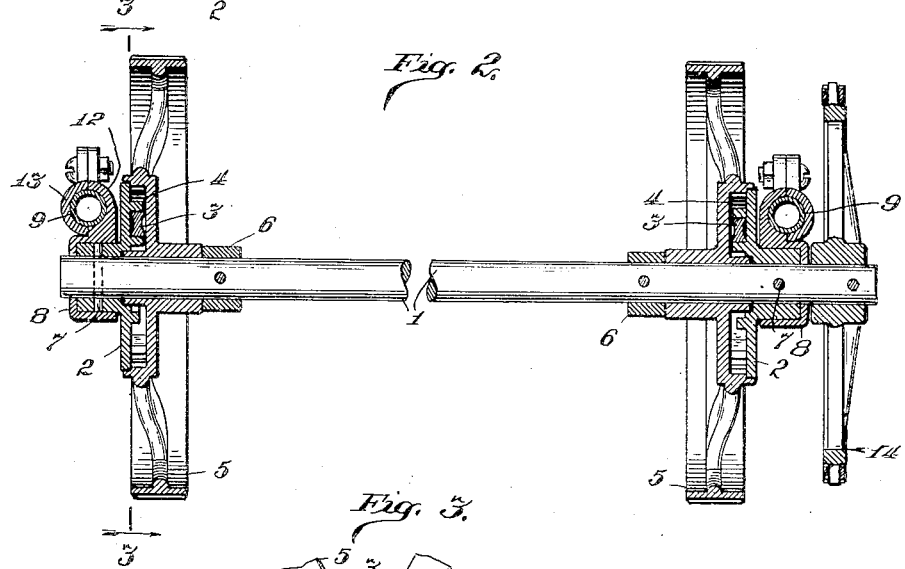
Fig. 2 is a vertical transverse section of the same on the line 2—2 of Fig. 1.
Figure 3:
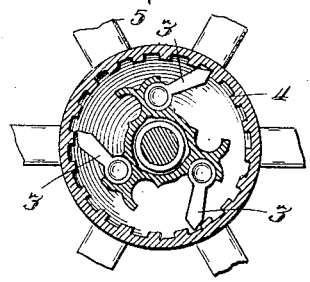
Fig. 3 is a fragmentary detail vertical section on the line 3—3 of Fig. 2, the rim of the traction wheel being broken away.

Referring now to said drawings, the drive-shaft 1 is rigid with the disks 2 carrying the pivoted dogs 3 adapted to engage the internal ratchet-wheels 4 rigid with the tractor-wheels 5 which are of ordinary construction and are loosely mounted on the shaft 1 and held in place relatively to the disks 2 by means of the collars 6 on said shaft. The hubs of the disks 2 extend outwardly and are keyed to the shaft 1 by means of the pins 7. Said hubs are journaled in bearings 8 which are in turn mounted upon the forward ends of the tubular side rails 9 of the frame, the latter being preferably made of wrought iron pipe and are bent at their rear ends to provide perpendicular downwardly extending projections 10 in which the shaft or axle of the caster-wheels or roller 11 is received, as hereinafter more particularly described. The bearings 8 are integral with clamp elements 12 adapted to be bolted to companion clamp elements 13 whereby the bearings are rigidly engaged with the side rails 9.

At one end the shaft 1 carries a large sprocket wheel 14.

The carrier for the wipers and shear blades, constituting the mowing elements of the structure, consists of a pair of opposed side plates 15 connected together by means of a plurality of rods 16 in a well known manner. The said plates 15 contain bearings for the shaft 17 of the wipers and are provided on their outer faces with parallel vertical ribs 18 each of which is provided with a threaded opening 19 to receive a set screw 20. Said ribs 18 are adapted to be received between the parallel guide ribs 21 bordering longitudinal slots 22 in the projections 23 of a clamping element 24 adapted to be bolted to companion clamping elements to engage the side rails 9 between the clamps 12 and the perpendicular ends 10 thereof. The said screws 20 project through the guide slots 22 and the heads thereof engage the outer faces of said arms or projections 23 to firmly hold the cutter-carrier at any desired elevation with respect to the side rails. The sprocket-chain 26 is trained over the large sprocket 14 and a sprocket pinion 27 on the shaft 17 outwardly of one of the side-plates of said frame. The said chain will permit a certain limited variation in the elevation of the shaft 17 with respect to the shaft 1 before it becomes too loose to properly perform its functions by reason of the fact that the clamping elements 24 and 25 will permit the shafts 1 and 17 to be separated more or less to maintain the sprocket chain 26 as taut as is necessary to efficient operation. The adjustment in elevation of the wiper carrier may be given as high a range as the height of the grass to be cut may render necessary to enable the top ends of the grass to be cut first and thereafter by lowering the cutter unit with respect to the frame further cut down so that by successive cuttings grass of any height may be mowed with ease and despatch.

For ordinary latitude of adjustment it is preferable to vary the elevation of the shaft of the roller or other revoluble support 11, the said shaft being engaged at its ends in the bifurcated ends of collars 28 at the lower ends of the arms 10 of the side rails 9 and clamped at any desired elevation therein by means of the nuts 29 engaging the threaded ends of the preferably non-rotatable axle or shaft of the roller 11. If the latitude adjustment thus afforded is insufficient then, of course, the elevation of the cutter unit will be changed as desired by moving the same in its vertical guides and the position of the latter on the side rails 9 varied to accommodate the device to perform the desired function.

The yoke 30 of the propeller handle 31 of the mower is preferably pivotally secured to the side rails 9 between the clamping elements 24—25 and 12—13. In the instance illustrated I have shown the trunnions or other desired form of pivot extending through transverse bores in the pipe, but obviously this mode of pivoting said yoke to the side frame may be changed and varied, as desired, without departing from the invention.

While I have herein illustrated the preferred embodiment of the invention it will be understood, of course, that said embodiment may be changed and varied in details of construction without departing from the invention as defined in the appended claims.

I claim as my invention:

1. A lawn mower comprising in combination, a frame, a pair of tractor wheels supporting the same, cutting mechanism geared to said tractor wheels, means permitting vertical adjustment of the cutting mechanism on the frame, and separate means permitting adjustment of the cutting mechanism on the frame toward and from the tractor wheels to compensate for variations in the distance between the cutting mechanism and tractor wheels due to vertical adjustment, substantially as described.

2. A lawn mower comprising a frame, a pair of tractor wheels supporting one end thereof, rotatable means supporting the other end thereof, grass-cutting means mounted on said frame between the respective supporting elements therefor, and vertically adjustable relatively to said supporting elements, a sprocket wheel operatively associated with said tractor wheels to rotate in unison therewith in one direction, a sprocket pinion associated with the grass-cutting means and geared to said sprocket wheel, and means for moving said cutting means and said sprocket-pinion toward and from said tractor wheels to compensate for variations in distance separating the same due to variations in elevation of said cutting means.

3. A lawn mower comprising a pair of horizontally disposed parallel side rails, bearings for a drive shaft secured to the forward ends thereof, a drive-shaft journaled in said bearings, a pair of tractor-wheels for actuating said drive-shaft, a rotatable support for the rear end of the frame, grass-cutting means including a rotatable element mounted between the ends of said side rails and vertically adjustable relatively thereto, a sprocket pinion rigid with said rotatable element, a sprocket wheel rigid with the drive-shaft, a sprocket chain trained over said sprocket wheel and pinion, and means for moving said cutting means longitudinally of said side rails.

4. A lawn mower comprising a pair of horizontally disposed parallel side rails, bearings for a drive shaft secured to the forward ends thereof, a drive-shaft journaled in said bearings, a pair of tractor-wheels for actuating said drive-shaft, a rotatable support for the rear end of the frame, a pair of opposed vertical guide elements mounted on said side rails between their ends and movable longitudinally thereof, a pair of bearings mounted on said guide elements and vertically adjustable thereon, grass-cutting means associated with said bearings including a rotatable shaft for one of the cutting elements journaled in said bearings, a sprocket-pinion rigid with said shaft, a sprocket wheel rigid with the drive-shaft, a sprocket chain trained over said sprocket wheel and pinion.

5. A lawn mower comprising in combination, a frame, a pair of tractor wheels supporting the same, a cutting unit mounted on the frame at a point removed from the axis of rotation of the tractor wheels, a chain and sprockets for communicating the rotative movement of the tractor wheels to the cutting unit, means permitting substantial vertical adjustment of the cutting unit on the frame, and separate means permitting adjustment of the cutting unit toward and from the tractor wheels, substantially as described.

6. In a lawn mower, the combination of a pair of tractor wheels, bearings for supporting the same, frame members mounted outside of the tractor wheels and projecting horizontally rearwardly from the tractor wheel bearings, thence downwardly at substantially right angles, a roller mounted on the downwardly projecting ends of said frame members, a cutting unit mounted on the frame between the ends thereof, means connecting the tractor wheels to the cutting unit, and means for effecting vertical adjustment of the cutting unit relative to the frame, substantially as described.

7. In a lawn mower, the combination of a pair of tractor wheels, a frame projecting horizontally rearwardly from the tractor wheels, rotative means for supporting the rearwardly projecting end of the frame, a cutting unit mounted on the frame, means for gearing the rotative element of the cutting unit to the tractor wheel, and means for effecting horizontal and vertical adjustment of the cutting unit on the frame, substantially as described.

8. In a lawn mower, the combination of tractor wheels, wheel bearings having portions located outside of the wheels, arms mounted on said outside portions and extending rearwardly and thence downwardly, a roller connected to the free ends of the downwardly projecting portions, a cutting unit the cutting element of which is rotatively connected to the tractor wheels, said unit being mounted on the horizontal portions of said arms, and means for effecting horizontal adjustment of the cutting unit on the arms, substantially as described.

9. In a lawn mower, the combination of a pair of tractor wheels having exterior bearing supports, tubular arms mounted in said bearing supports and projecting horizontally from the tractor wheels, a ground-contacting roller for supporting the outer ends of the arms and maintaining the same in horizontal position, a cutter geared to the tractor wheels and mounted on the tubular arms, and means for effecting substantial vertical adjustment of the cutter on the arms, substantially as described.

10. In a lawn mower, the combination of tractor wheels having exterior bearing supports, tubular arms mounted in said bearing supports and projecting rearwardly from the tractor wheels, a ground-contacting roller for supporting the outer ends of the arms, a cutting unit geared to the tractor wheels, means for adjusting the unit vertically on the arms, and separate means for adjusting the unit longitudinally of the arms, substantially as described.

11. In a lawn mower, the combination of tractor wheels having bearing supports, tubular arms mounted on one end in said bearing supports and projecting substantially horizontally therefrom, a ground-contacting roller for supporting the opposite ends of the arms, a cutting unit geared to the tractor wheels and mounted on the arms between the tractor wheels and roller with capacity for adjustment longitudinally of the arms, and separate means for effecting vertical adjustment of the cutting unit, substantially as described.

HARRY T. COLDWELL.